United States Patent
Sankaranarayanan et al.

(10) Patent No.: US 12,407,731 B2
(45) Date of Patent: Sep. 2, 2025

(54) ROUTING TECHNIQUES FOR ENHANCED NETWORK SECURITY

(71) Applicant: Cisco Technology, Inc., San Jose, CA (US)

(72) Inventors: Madhan Sankaranarayanan, Chinnamanur (IN); Nagendra Kumar Nainar, Morrisville, NC (US); Jaganbabu Rajamanickam, Kanata (CA); Selvam Murugesan, Chennai (IN); Monitto Pitchaimani Sebastin, Tiruchirappalli (IN); Craig Thomas Hill, Sterling, VA (US)

(73) Assignee: Cisco Technology, Inc., San Jose, CA (US)

( * ) Notice: Subject to any disclaimer, the term of this patent is extended or adjusted under 35 U.S.C. 154(b) by 202 days.

(21) Appl. No.: 18/352,165

(22) Filed: Jul. 13, 2023

(65) Prior Publication Data
US 2025/0023919 A1    Jan. 16, 2025

(51) Int. Cl.
*H04L 9/40* (2022.01)
*H04L 45/24* (2022.01)

(52) U.S. Cl.
CPC .............. *H04L 63/20* (2013.01); *H04L 45/24* (2013.01); *H04L 63/1425* (2013.01)

(58) Field of Classification Search
CPC ...... H04L 63/20; H04L 45/24; H04L 63/1425
See application file for complete search history.

(56) References Cited

U.S. PATENT DOCUMENTS

| | | | | |
|---|---|---|---|---|
| 7,864,959 | B2* | 1/2011 | Dhawan | H04L 9/3247 |
| | | | | 713/168 |
| 9,467,478 | B1* | 10/2016 | Khan | H04L 63/0272 |
| 9,762,537 | B1 | 9/2017 | Eyada | |
| 2006/0069727 | A1* | 3/2006 | Fuller | H04L 51/04 |
| | | | | 709/206 |
| 2018/0359172 | A1* | 12/2018 | Yadav | H04L 45/70 |
| 2020/0059457 | A1 | 2/2020 | Raza et al. | |
| 2020/0322383 | A1* | 10/2020 | Filsfils | H04L 63/08 |
| 2020/0374213 | A1 | 11/2020 | Dhanabalan | |
| 2022/0247757 | A1 | 8/2022 | Bhandari et al. | |
| 2022/0263708 | A1 | 8/2022 | Ramachandran et al. | |
| 2022/0368696 | A1* | 11/2022 | Karpovsky | H04L 63/102 |

FOREIGN PATENT DOCUMENTS

| | | |
|---|---|---|
| CA | 2887428 C | 7/2014 |
| CN | 105991617 A | 4/2020 |

OTHER PUBLICATIONS

Ample Using BGP Based Traffic Engineering with Admission Control Algorithm, (IJETT)—vol. 4, Issue5—May 2013, pp. 2188-2193) by Palanisamy et al. (Year: 2013).*

* cited by examiner

*Primary Examiner* — Oleg Korsak
(74) *Attorney, Agent, or Firm* — Lee & Hayes, P.C.

(57) ABSTRACT

Techniques for optimizing routing decisions based on security metrics within a network environment are described herein. In some cases, by using various security metrics, such as encryption indicators, attestation indicators, secureness metrics, and reliability metrics, an exemplary system can assess the security level and reliability of network paths. These metrics may provide valuable insights into the trustworthiness and integrity of participating nodes and links and enable informed decision-making regarding path selection.

20 Claims, 8 Drawing Sheets

ROUTING TECHNIQUES FOR ENHANCED NETWORK SECURITY

TECHNICAL FIELD

This present application pertains to the field of computer networking and more specifically, to techniques for routing network traffic based on security and reliability metrics.

BACKGROUND

Modern computer networks have become increasingly complex and interconnected, requiring efficient routing techniques to facilitate the reliable and secure transfer of data. Existing routing protocols often have limitations in terms of scalability, adaptability, and security. Therefore, there is a need for improved routing techniques that address these limitations and enhance network efficiency and security.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DESCRIPTION OF EXAMPLE EMBODIMENTS

Overview

Figure 1:
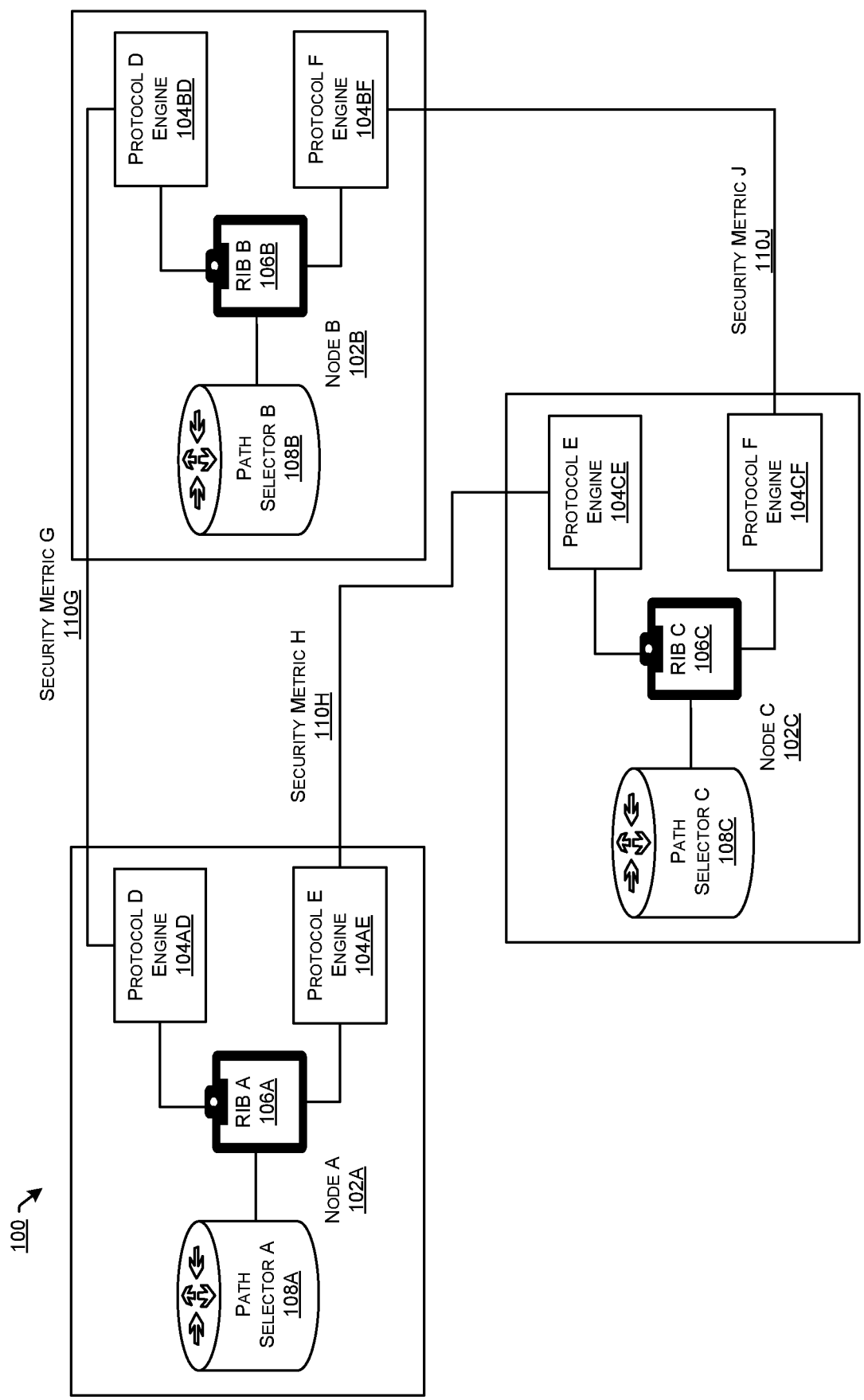
FIG. 1 provides an example network environment.

This document describes techniques for optimizing routing decisions based on security metrics within a network environment. In some aspects, the techniques described herein relate to a method including receiving, using a first routing protocol, a first security metric associated with a first path to a destination node, wherein the first security metric is associated with a first weight; determining, using a first path computation operation associated with the first routing protocol, a first routing protocol cost measure associated with the first path. The method may further include determining, based on the first security metric, a first security cost measure associated with the first path; determining, based on the first routing protocol cost measure and the first security cost measure, that the first path is recommended by the first routing protocol for data transmission to the destination node. The method may further include receiving, using a second routing protocol, a second security metric associated with a second path to the destination node, wherein the second security metric is associated with a second weight; determining, using a second path computation operation associated with the second routing protocol, a second routing protocol cost measure associated with the second path. The method may further include determining, based on the second security metric, a second security cost measure associated with the second path; determining, based on the second routing protocol cost measure and the second security cost measure, that the second path is recommended by the second routing protocol for data transmission to the destination node. The method may further include, based at least in part on determining that the first path and the second path are distinct, determining a selected path to the destination node based at least in part on the first weight and the second weight.

In some aspects, the techniques described herein relate to a method including: receiving a request for evaluating a first path from a source node to a destination node; determining that the first path comprises a first link in a first network domain and a second link in a second network domain, wherein the first network domain is associated with a first security data schema and the second network domain is associated with a second security data schema; receiving a first security metric associated with the first network domain from a first monitoring system associated with the first network domain, wherein the first security metric corresponds to the first security data schema; receiving a second security metric associated with the second network domain from a second monitoring system associated with the second network domain, wherein the second security metric corresponds to the second security data schema; determining an evaluation score for the first path based at least in part on the first security metric and the second security metric; and selecting a recommended path for data transmission from the source node to the destination node based at least in part on the evaluation score.

Additionally, the techniques described herein may be performed by a system and/or device having non-transitory computer-readable media storing computer-executable instructions that, when executed by one or more processors, performs the method described above.

Example Embodiments

This document describes techniques for optimizing routing decisions based on security metrics within a network environment. In some cases, by using various security metrics, such as encryption indicators, attestation indicators, secureness metrics, and reliability metrics, an exemplary system can assess the security level and reliability of network paths. These metrics may provide valuable insights into the trustworthiness and integrity of participating nodes and links and enable informed decision-making regarding path selection.

In some cases, the techniques described herein include augmenting a routing protocol by incorporating a security metric into the path computation logic of the routing protocol. To evaluate a candidate path in accordance with a given routing protocol, an exemplary system may compute and use at least one of two measures: (i) a routing protocol cost measure for the candidate path, and (ii) a security cost measure for the candidate path. The routing protocol cost measure may represent a measure of cost associated with the path as determined by data learned through predefined and/or conventional metrics associated with the protocol, while the security cost measure may represent a measure of cost associated with the path as determined by the security metric data learned by the protocol.

In some cases, a routing protocol is augmented/improved by adding one or more security metrics to the data learned using the routing protocol. For example, the data learned using the routing protocol may not include attestation indicators, but the routing protocol may be augmented by collecting attestation indicators using the routing protocol. In some cases, because a routing protocol can be used to collect one or more conventional metrics and one or more added security metrics, the data collected by the routing protocol may be used to determine two different cost measures: a routing protocol cost measure that may be determined by combining the conventional metrics in accordance with a first computational model and a security cost measure that may be determined by combining the added security metrics in accordance with a second computational model.

For example, if a node uses an Open Shortest Path First (OSPF) protocol that is augmented by using Bidirectional Forwarding Detection (BFD) to monitor network reliability, the system may evaluate a network path by: (i) computing an OSPF cost measure for the network path based on conventional features used to compute the recommended path in OSPF including features describing bandwidths associated with network links, (ii) computing a cost measure for the network path based on reliability metric data (e.g., at least one of BFD data, OAM data, link flap counts, frequency of link flaps, aggressive timer interval detections, and data regarding hosting OAM sessions in hardware or software), and (iii) determining whether the evaluated network path should be adopted as the path recommended by OSPF based on the OSPF cost measure and the security cost measure.

As another example, if a node uses an Enhanced Interior Gateway Routing protocol (EIGRP) routing protocol that is augmented by collecting attestation indicators, the node's RIB can assess network paths by: (i) calculating an EIGRP cost measure for the path using traditional factors such as bandwidth and delay, (ii) deriving a security cost measure based on the collected attestation indicators, and (iii) evaluating the suitability of the path by considering both the EIGRP cost measure and the security cost measure.

The augmentation of a routing protocol with additional security metrics allows for a more comprehensive evaluation of network paths. By incorporating these security metrics, such as attestation indicators or reliability metrics collected through techniques like BFD, the routing protocol gains insights into the security and reliability aspects of the network. The routing protocol can then compute separate cost measures for the conventional metrics and the added security metrics using distinct computational models. This differentiation enables a more fine-grained evaluation of paths based on both traditional and security-related factors. By combining the traditional cost measures and the security cost measures, routing protocols can make more informed decisions regarding path selection. This augmentation enhances the protocol's ability to consider both performance-related factors and security requirements, ultimately leading to more secure and efficient routing within the network.

In some cases, the techniques described herein include selecting an optimal network path from the paths recommended by various routing protocols based on weights associated with those routing protocols. The routing protocols may recommend multiple paths for data transmission within the network. However, not all paths may be equally suitable in terms of factors such as performance, reliability, or security. To determine the optimal path, weights may be associated with each routing protocol.

The weights assigned to routing protocols may reflect their desirability or preference in the path selection process based on security considerations. For example, a routing protocol that collects attestation indicators or uses advanced monitoring techniques may be assigned a higher weight due to its ability to provide enhanced security and reliability measures. In some cases, by using the weights associated with each routing protocol, the techniques described herein select the most optimal path for data transmission based on security awareness of those routing protocol.

In some cases, the weight of a routing protocol is determined based on the reliability and/or security of the security metric data collected by the routing protocol. For example, a routing protocol that collects attestation indicators may have a higher weight relative to a routing protocol that does not collect attestation indicators. As another example, a routing protocol that uses BFD to monitor the network may have a higher weight relative to a routing protocol that does not use BFD to monitor the network. As a further example, a routing protocol that uses BFD with authentication may have a higher weight relative to a routing protocol that uses BFD without authentication.

In some cases, the weight assigned to a routing protocol reflects the importance placed on the reliability and security of the security metric data collected by that protocol. For example, a routing protocol that collects attestation indicators may be given a higher weight compared to a protocol that does not gather such indicators. This emphasis on attestation indicators may enable the path selector to prioritize paths that provide stronger verification of the identity and integrity of the participating nodes.

In some cases, an exemplary system may be configured to determine a recommended path from the paths recommended by the node's routing protocols based on weights associated with the routing protocols. For example, the system may select the path recommended by the highest-weighted routing protocol as the recommended path. As another example, the system may determine a path score for each candidate path based on the weights of all of the routing protocols that recommended the candidate path. In some cases, the system may determine the candidate path having the highest path score as the recommended path for transmitting data to a destination node associated with the set of candidate paths. For example, if two candidate paths exist between a source node and a destination node including a path P1 that is recommended by a first protocol having a weight W1 and a third protocol having a second weight W2 and a second path P2 that is recommended by a second protocol having a weight W3, then the system may select P1 as the recommended path if W1+W2>W3.

In some cases, assigning appropriate weights and comparing path scores derived from the weighted recommendations, the techniques enable the selection of the most suitable path for data transmission, taking into account performance, reliability, security, and other factors relevant to the network's objectives and requirements.

In some cases, the techniques described herein relate to a federated routing engine that operates as a central entity for path evaluation and recommendation within a multi-domain network environment. This routing engine may receive security metric data from different network domains, considering the monitoring data collected by the security measures implemented within each domain. These security metrics can encompass various factors such as encryption indicators, attestation indicators, secureness metrics, or other relevant security-related information. By aggregating the security metric data and assigning domain scores, the routing engine can calculate an evaluation score for each candidate end-to-end path. This evaluation score may be used as a measure of a candidate path's security and aid in selecting the most secure route for data transmission.

In some cases, by aggregating the security metric data and assigning domain scores, the federated routing engine generates an evaluation score for each candidate end-to-end path. This evaluation score may be used as a quantifiable measure of the expected security level associated with each candidate path. The evaluation score may also be used in assessing the trustworthiness and integrity of the entire path to aid in the selection of the most secure route for data transmission. In some cases, the federated routing engine's evaluation score is determined based on the collective security metric data from the network domains to enable a comprehensive assessment of the candidate paths' security. This approach may facilitate an informed decision-making process when determining the most secure route for data transmission across the multi-domain network environment.

In some cases, the implementation of the federated routing engine involves developing the necessary software or firmware to collect, process, and analyze the security metric data from the network domains. The routing engine may apply algorithms to calculate the evaluation score for each candidate path by taking into account the domain scores derived from the security metric data. In some cases, by utilizing the evaluation score as a measure of security, the federated routing engine contributes to selecting the most secure route for data transmission. This enhances the network's overall security posture by ensuring that sensitive data or critical communications follow the path with the highest security level.

FIG. 1 provides an example network environment 100 that includes three network nodes: Node A 102A, Node B 102B, and Node C 102C. Each node may represent a router within the network. Each node may include a set of protocol engines, a routing information database (RIB), and a path selector.

Node A 102A, Node B 102B, and Node C 102C may be routers within network environment 100. They may be configured to receive, process, and forward network packets based on the routing protocols implemented by the associated protocol engines. A protocol engine may be configured to exchange a security metric associated with a corresponding routing protocol with one or more other nodes that use the corresponding routing protocol and store received security metric data in the RIB of the corresponding node. For example, node A 102A includes a protocol D engine 104AD associated with a routing protocol D and a protocol E engine 104AE associated with a routing protocol E. Furthermore, node B 102B includes a protocol D engine 104BD associated with the routing protocol D and a protocol F engine 104BF associated with a routing protocol F. Moreover, node C 102C includes a protocol E engine 104CE associated with the routing protocol E and a protocol F engine 104CF associated with the routing protocol F.

Each routing protocol engine may be configured to exchange a security metric with other nodes that use that routing protocol and store the received security metric data in the respective RIB of the node that includes the particular routing protocol engine. For example, the protocol D engine 104AD of node A 102A may be configured to exchange a security metric G 110G with the protocol D engine 104BD of node B 102B. Furthermore, the protocol E engine 104AE of node B 102B may be configured to exchange a security metric H 110H with the protocol E engine 104CE of node C 102C. Moreover, the protocol F engine 104BF of node B 102B may be configured to exchange a security metric J 110J with the protocol F engine 104CF of node C 102C.

Each node maintains a RIB. For example, node A 102A maintains the RIB A 106A, node B 102B maintains the RIB B 106B, and node C 102C maintains the RIB C 106C. A RIB may be configured to store routing information and network topology data (e.g., security metric data) learned through the routing protocols implemented by its respective node. For example, RIB A 106A stores routing information and network topology data learned by the protocol D engine 104AD via routing protocol D and the protocol E engine 104AE via routing protocol E. Furthermore, RIB B 106B stores routing information and network topology data learned by the protocol D engine 104BD via routing protocol D and the protocol F engine 104BF via routing protocol F. Moreover, RIB C 106C stores routing information and network topology data learned by the protocol E engine 104CE via routing protocol E and the protocol F engine 104CF via routing protocol F.

In the network environment 100 depicted in FIG. 1, each routing protocol has the capability to exchange data associated with a corresponding security metric. Accordingly, in some cases, different routing protocols may require exchanging different security metrics (e.g., different sets of security features). A security metric may include a set of features that relate to the security of at least one node within the network. These features may provide valuable insights into various aspects of security within the network. Examples of security features include: (i) an encryption indicator describing whether at least one network node encrypts data transmitted on a first link in the first path; (ii) an attestation indicator describing whether an attestation token provided by at least one network node is verified; (iii) a secureness metric associated with at least one network node and/or at least one network link (e.g., as computed based on data obtained using a network traffic analysis (NTA) operation); and (iv) a reliability metric associated with at least one network path (e.g., as determined based on data obtained using an operations, administration and maintenance (OAM) routing protocol). In some cases, a security metric is distributed to a node by a neighbor node and using a link state data distribution operation associated with the corresponding routing protocol.

In some cases, an encryption indicator describes whether at least one network node (e.g., each neighbor node of a receiving node) encrypts data transmitted prior to transmission. In some cases, when a node implements a routing protocol that exchanges encryption indicators, the node receives data describing whether each of a set of network nodes encrypts data prior to transmission. In some cases, a network path can be scored based on the extent to which data transmitted on the path is encrypted, as determined based on whether the transmitting nodes associated with the network path encrypt data prior to transmission.

In some cases, an attestation indicator describes whether an attestation token provided to at least one network node (e.g., each neighbor node of a receiving node) is verified. In some cases, an attestation token may allow for providing a unidirectional integrity check within a cluster of nodes, or between nodes of different clusters. Any node may query a second node, e.g., a remote node, to validate the integrity (e.g., to ensure the node is not compromised) by sending a query with a random "nonce." The second node may query a trusted platform module (TPM) to generate a new hash based on the received nonce that will be used as part of the attestation token to verify the integrity of the second node. Exemplary aspects of attestation tokens are described in greater detail in U.S. patent application Ser. No. 17/035,065, filed on Sep. 28, 2020, entitled "Integrity Verified Paths between Entities in a Container-Orchestration System," which is incorporated by reference in its entirety. In some cases, a network path can be scored based on the extent to which one or more nodes associated with the network path are verified using attestation tokens.

In some cases, a secureness metric describes one or more security features associated with at least one network node (e.g., each neighbor node of a receiving node) and/or at least one network node. Examples of security features associated with a network node include a feature describing whether encryption is enabled on the node, a feature describing what type of encryption is enabled on the node, a feature describing uptime of a tunnel associated with a node. In some cases, a protocol engine of a node and/or a network controller execute one or more granular security monitoring test cases to monitor and test/predict the security of nodes, links, tunnels, and/or paths within the network. In some cases, based on the test case results, specific nodes and/or links can be assigned a security score. In some cases, the secureness indicator provides a quantitative measure of the security level of a network path based on one or more factors such as packet inspection, anomaly detection, or behavior analysis. In some cases, by incorporating the secureness score in the exchanged data, nodes can assess the relative security of different paths and make informed routing decisions to prioritize more secure routes.

In some cases, a reliability metric provides a measure of operational reliability and/or integrity of at least one network node and/or at least one network link. In some cases, the reliability metric can be computed using monitoring data obtained using an OAM protocol. In some cases, the OAM protocol is implemented using one or more OAM tools. Examples of OAM tools include Bidirectional Forwarding Detection (BFD), Seamless BFD (SBFD), and Performance Monitoring (PM). In some cases, the monitoring data may include attributes such as link latency, packet loss, congestion level(s), and/or the like. In some cases, by including the monitoring data in the exchanged information, nodes can gain insights into the health and stability of the network paths, enabling them to select paths that exhibit optimal performance and reliability.

Accordingly, in some cases, the RIB associated with a node that implements P routing protocols collects and/or stores the routing information and network topology data (e.g., security metric data) learned through the P routing protocols implemented by the particular node. In some cases, subsequent to collecting and/or storing the routing information and topology data, the RIB (or a path computation component associated with the RIB) computes P recommended paths, where each recommended path is a network path for forwarding a packet to a destination node as computed based on routing information and network topology data collected by a respective one of the P routing protocols.

For example, in FIG. 1, RIB A 104A: (i) uses the routing information and network topology data (e.g., including the security metric data associated with the security metric G 110G) learned through the routing protocol D to determine a first recommended path for transmission of a packet, and (ii) uses the routing information and network topology data (e.g., including the security metric data associated with the security metric H 110H) learned through the routing protocol E to determine a second recommended path for transmission of the same packet. Furthermore, RIB B 104B: (i) uses the routing information and network topology data (e.g., including the security metric data associated with the security metric G 110G) learned through the routing protocol D to determine a first recommended path for transmission of a packet, and (ii) uses the routing information and network topology data (e.g., including the security metric data associated with the security metric J 110J) learned through the routing protocol F to determine a second recommended path for transmission of the same packet. Moreover, RIB C 106C: (i) uses the routing information and network topology data (e.g., including the security metric data associated with the security metric H 110H) learned through the routing protocol E to determine a first recommended path for transmission of a packet, and (ii) uses the routing information and network topology data (e.g., including the security metric data associated with the security metric J 110J) learned through the routing protocol F to determine a second recommended path for transmission of the same packet.

Accordingly, if a RIB is associated with a node that implements P routing protocols, the RIB may store routing information and network topology data associated with P sets of security metrics. Moreover, if a RIB is associated with a node that implements P routing protocols, the RIB may compute P recommended paths for transmission of a packet to a destination node. In some cases, to compute a recommended path for transmission of a packet using a particular routing protocol, a RIB may evaluate a set of candidate paths that all originate from the RIB's node and terminate at a desired destination node. To evaluate a candidate path in accordance with a given routing protocol, the RIB may compute and use at least one of two measures: (i) a routing protocol cost measure for the candidate path, and (ii) a security cost measure for the candidate path. The routing protocol cost measure may represent a measure of cost associated with the path as determined by data learned through predefined and/or conventional metrics associated with the protocol, while the security cost measure may represent a measure of cost associated with the path as determined by the security metric data learned by the protocol.

In some cases, a routing protocol is augmented/improved by adding one or more security metrics to the data learned using the routing protocol. For example, the data learned using the routing protocol may not include attestation indicators, but the routing protocol may be augmented by collecting attestation indicators using the routing protocol. In some cases, because a routing protocol can be used to collect one or more conventional metrics and one or more added security metrics, the data collected by the routing protocol may be used to determine two different cost measures: a routing protocol cost measure that may be determined by combining the conventional metrics in accordance with a first computational model and a security cost measure that may be determined by combining the added security metrics in accordance with a second computational model.

For example, if a node uses an Open Shortest Path First (OSPF) protocol that is augmented by using BFD to monitor network reliability, the node's RIB may evaluate a network path by: (i) computing an OSPF cost measure for the network path based on conventional features used to compute the recommended path in OSPF including features describing bandwidths associated with network links, (ii)

computing a security cost measure for the network path based on security metric data obtained using BFD, and (iii) determining whether the evaluated network path should be adopted as the path recommended by OSPF based on the OSPF cost measure and the security cost measure.

As another example, if a node uses an Intermediate System to Intermediate System (ISIS) protocol that is augmented by using attestation indicators, the node's RIB may evaluate a network path by: (i) computing an ISIS cost measure for the network path based on at least one of a Level 1 (L1) or a Level 2 (L2) cost score, (ii) computing a security cost measure for the network path based on determined attestation indicators, and (iii) determining whether the evaluated network path should be adopted as the path recommended by ISIS based on the ISIS cost measure and the security cost measure.

Accordingly, to select a candidate path as the path recommended by a particular routing protocol, the routing protocol cost measure and the security cost measure associated with the particular routing protocol may be combined. In some cases, after computing a routing protocol cost measure and a security cost measure associated with a routing protocol in relation to a candidate path, the RIB determines a collapsed cost measure based on (e.g., by summing, by determining a weighted sum of, and/or the like) the routing protocol cost measure and the security cost measure, and then selects the candidate path having the lowest collapsed cost measure as the path recommended by the routing protocol. In some cases, after computing a routing protocol cost measure and a security cost measure associated with a routing protocol in relation to a candidate path, the RIB: (i) selects a subset of candidate paths that include each path whose security cost measure falls below a threshold, and (ii) selects the path in the subset that has the lowest routing protocol cost measure as the path recommended by the routing protocol.

For example, if three candidate paths exist between a source node and a destination node, the RIB may: (i) determine routing protocol cost measures PC1, PC2, and PC3 for the three candidate paths respectively with respect to a particular protocol, (ii) determine security cost measures SC1, SC2, and SC3 for the three candidate paths respectively with respect to the particular protocol, and (iii) select a candidate path whose collapsed cost measure is determined based on min (PC1+SC1, PC2+SC2, PC3+SC3) as the candidate path that is recommended by the particular protocol.

As another example, if three candidate paths exist between a source node and a destination node, the RIB may: (i) determine routing protocol cost measures PC1, PC2, and PC3 for the three candidate paths respectively with respect to a particular protocol, (ii) determine security cost measures SC1, SC2, and SC3 for the three candidate paths respectively with respect to the particular protocol, (iii) determine a subset of the three candidate paths whose security cost measures falls below a threshold, and (iv) select a candidate path whose routing protocol cost measure is lowest among the routing protocol cost measures associated with the candidate paths in the subset as the candidate path that is recommended by the particular protocol.

As further depicted in FIG. 1, each node maintains a path selector. For example, node A 102A maintains the path selector A 108A, node B 102B maintains the path selector B 108B, and node C 102C maintains the path selector C 108C. A node's path selector may be configured to select one of the paths recommended by the routing protocols associated with the node as the recommended path. For example, the path selector A 108A may be configured to select a recommended path from the path recommended by the protocol D engine 104AD and the path recommended by the protocol E engine 104AE. Furthermore, the path selector B 108B may be configured to select a recommended path from the path recommended by the protocol D engine 104BD and the path recommended by the protocol F engine 104BF. Moreover, the path selector C 108C may be configured to select a recommended path from the path recommended by the protocol E engine 104CE and the path recommended by the protocol F engine 104CF. In some cases, a node's path selector is a component of the node's RIB.

In some cases, a node's path selector may be configured to determine a recommended path from the paths recommended by the node's routing protocols based on weights associated with the routing protocols. For example, the path selector may select the path recommended by the highest-weighted routing protocol as the recommended path. As another example, the path selector may determine a path score for each candidate path based on the weights of all of the routing protocols that recommended the candidate path. In some cases, the path selector may determine the candidate path having the highest path score as the recommended path for transmitting data to a destination node associated with the set of candidate paths. For example, if two candidate paths exist between a source node and a destination node including a path P1 that is recommended by a first protocol having a weight W1 and a third protocol having a second weight W2 and a second path P2 that is recommended by a second protocol having a weight W3, then the source node's path selector may select P1 as the recommended path if W1+W2>W3.

In some cases, the weight of a routing protocol is determined based on the reliability and/or security of the security metric data collected by the routing protocol. For example, a routing protocol that collects attestation indicators may have a higher weight relative to a routing protocol that does not collect attestation indicators. As another example, a routing protocol that uses BFD to monitor the network may have a higher weight relative to a routing protocol that does not use BFD to monitor the network. As a further example, a routing protocol that uses BFD with authentication may have a higher weight relative to a routing protocol that uses BFD without authentication.

In some cases, the weight assigned to a routing protocol reflects the importance placed on the reliability and security of the security metric data collected by that protocol. For example, a routing protocol that collects attestation indicators may be given a higher weight compared to a protocol that does not gather such indicators. This emphasis on attestation indicators may enable the path selector to prioritize paths that provide stronger verification of the identity and integrity of the participating nodes.

In some cases, a routing protocol that utilizes BFD to monitor the network may be assigned a higher weight than a protocol that does not employ BFD for network monitoring. By leveraging BFD for rapid failure detection, the path selector can favor paths that offer enhanced fault detection capabilities and quicker recovery times. This may ensure that the network is equipped to respond swiftly to link or node failures, promoting improved network resilience and reducing potential service disruptions.

In some cases, a routing protocol that utilizes BFD with authentication may receive a higher weight in comparison to a protocol that employs BFD without authentication. By incorporating authentication mechanisms into the BFD process, the path selector can give preference to paths that offer stronger security measures and protect against potential threats such as unauthorized access or malicious attacks on the network.

Figure 2:
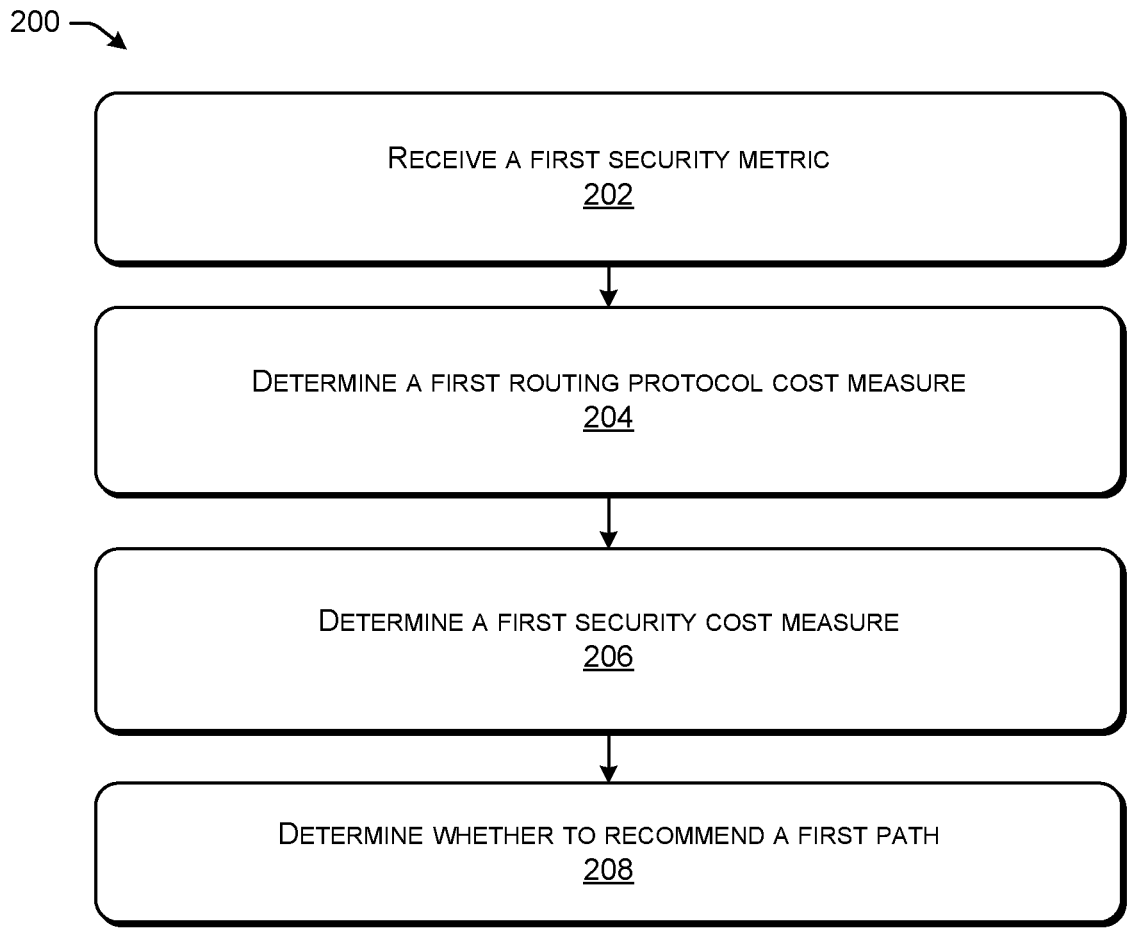
FIG. 2 is a flowchart diagram of an example process for determining whether a first network path is the path recommended by a first routing protocol.

FIG. 2 is a flowchart diagram of an example process 200 for determining whether a first network path is the path recommended by a first routing protocol. At operation 202, the process 200 includes receiving a first security metric associated with the first network path. The first security metric may include at least one of: (i) an encryption indicator describing whether at least one network node associated with the first network path encrypts data transmitted on a first link in the first path; (ii) an attestation indicator describing whether an attestation token provided by at least one network node associated with the first network path is verified; (iii) a secureness metric associated with at least one network node and/or at least one network link that is part of the first network path; or (iv) a reliability metric associated with the first network path.

At operation 204, the process 200 includes determining a first routing protocol cost measure associated with the first network path in relation to the first routing protocol. The routing protocol cost measure may represent a measure of cost associated with the first network path as determined by data learned through predefined and/or conventional metrics associated with the first routing protocol.

At operation 206, the process 200 includes determining a first security cost measure associated with the first network path in relation to the first routing protocol. The first security cost measure may represent a measure of cost associated with the first network path as determined based on the first security metric. In some cases, the first security cost measure may represent a measure of cost associated with the first network path as determined based on the security metric data obtained using the first routing protocol, including the first security metric.

At operation 208, the process 200 includes determining whether the first network path is recommended by the first routing protocol based on the first routing protocol cost measure and the first security cost measure. In some cases, after computing the first routing protocol cost measure and the first security cost measure, the system determines a first collapsed cost measure based on (e.g., by summing, by determining a weighted sum of, and/or the like) the first routing protocol cost measure and the first security cost measure. In some cases, the system selects the first network path as the path recommended by the first routing protocol if the first collapsed cost measure is the least collapsed cost measures among a set of collapsed cost measures associated with a set of candidate network paths including the first network path. In some cases, after computing the first routing protocol cost measure and the first security cost measure, the system: (i) determines whether the first network path is in a selected subset of candidate paths if the first collapsed cost measure falls below a threshold, and (ii) if the first network path is in the selected subset, selects the first network path as the path recommended by the first routing protocol if the first collapsed cost measure is the least collapsed cost measures among a set of collapsed cost measures associated with the selected subset.

Figure 3:
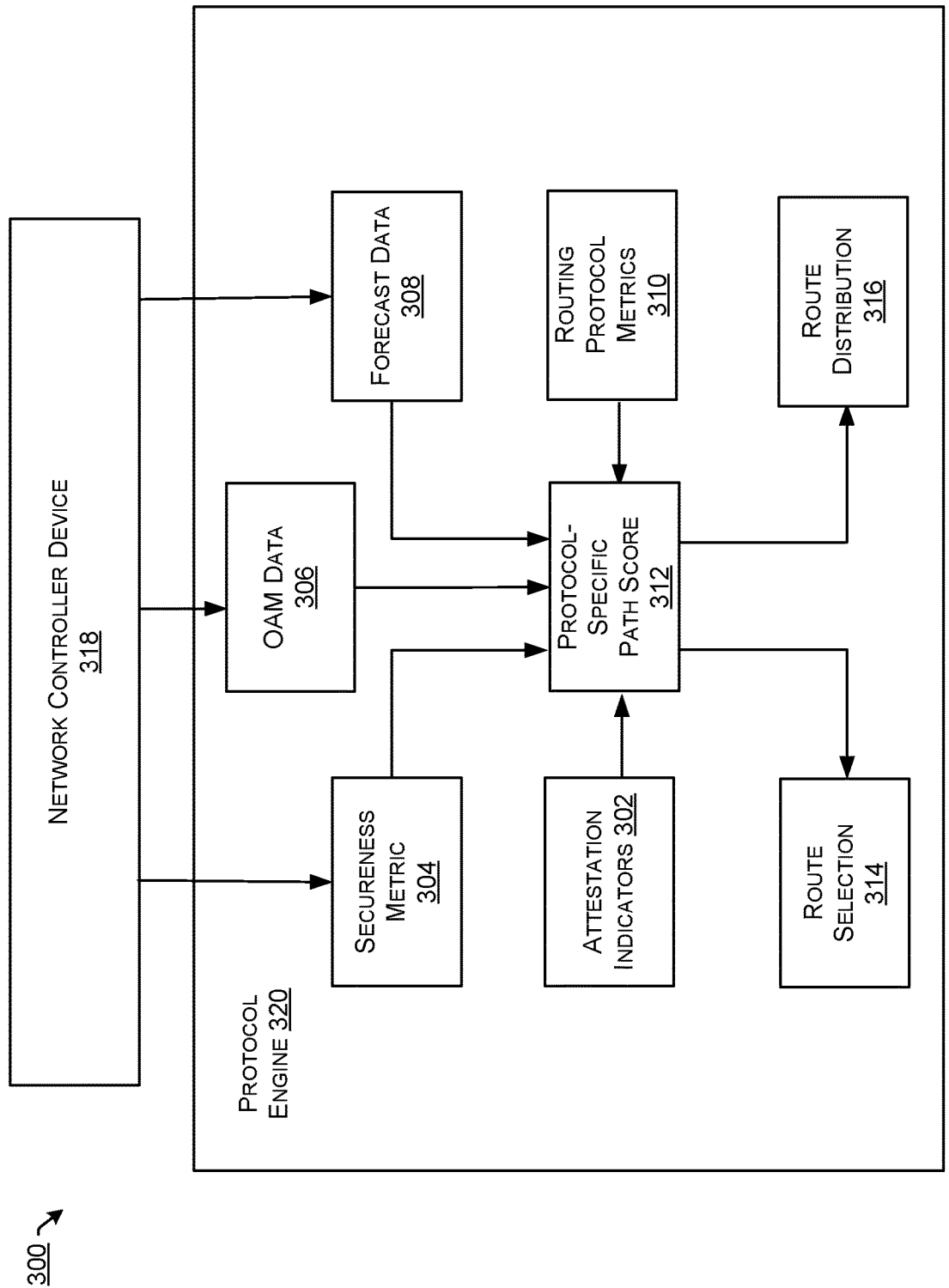
FIG. 3 provides an operational example of the operations of a protocol engine.

FIG. 3 provides an operational example 300 of the operations of a protocol engine 320. As depicted in FIG. 3, the protocol engine 320 receives a secureness metric 304, OAM data 306, and forecast data 308 from a network controller device 318. The secureness metric 304 may describe one or more security features associated with at least one network node (e.g., each neighbor node of a receiving node) and/or at least one network node. Examples of security features associated with a network node include a feature describing whether encryption is enabled on the node, a feature describing what type of encryption is enabled on the node, a feature describing uptime of a tunnel associated with a node. In some cases, a protocol engine of a node and/or a network controller execute one or more granular security monitoring test cases to monitor and test/predict the security of nodes, links, tunnels, and/or paths within the network.

The OAM data 306 may include data about the operational state, performance, and/or health of the network infrastructure. In some cases, the OAM data 306 provide insights into factors such as link latency, packet loss, congestion levels, or any other relevant metrics that impact the overall network performance. In some cases, by using the OAM data 306, the protocol engine 320 may compute a reliability metric. In some cases, the reliability metric provides a measure of operational reliability and/or integrity of at least one network node and/or at least one network link.

The forecast data 308 may describe observations, predictions and/or estimations related to network conditions, traffic patterns, or other factors that may influence the performance and availability of network paths in the future. In some cases, by using the forecast data 308, the protocol engine 320 can proactively adapt its routing decisions to optimize network performance, anticipate potential issues, and dynamically adjust the recommended paths based on the anticipated network conditions.

As further depicted in FIG. 3, the protocol engine 320 combines the secureness metric 304, the OAM data 306, and the forecast data 308 with a set of attestation indicators 302 and a set of routing protocol metrics 310 to determine a route selection output 314 and a route distribution output 316 based on a protocol-specific path score 312. The attestation indicators 302 may describe whether attestation tokens provided to at least one network node (e.g., each neighbor node of a receiving node) is verified. In some cases, an attestation token may allow for providing a unidirectional integrity check within a cluster of nodes, or between nodes of different clusters. Any node may query a second node, e.g., a remote node, to validate the integrity (e.g., to ensure the node is not compromised) by sending a query with a random "nonce." The second node may query a TPM to generate a new hash based on the received nonce that will be used as part of the attestation token to verify the integrity of the second node.

The routing protocol metrics 310 may be conventional metrics used to determine cost measures by a routing protocol that is associated with the protocol engine 320. In some cases, the protocol engine 320 determines, for each candidate path, a routing protocol cost measure based on the routing protocol metrics 310 and a security cost measure based on the attestation indicators 302, the secureness metric 304, the OAM data 306, and the forecast data 308. In some cases, the protocol engine 320 uses the determined cost measures to determine the route selection output 314 and the route distribution output 316. The route selection output 314 may describe a recommended path as selected based on the evaluation of various factors, including security, performance, and cost considerations. The route distribution output 316 may describe the instructions and/or actions required to disseminate this selected recommended route and/or the obtained routing data throughout the network.

Figure 4:
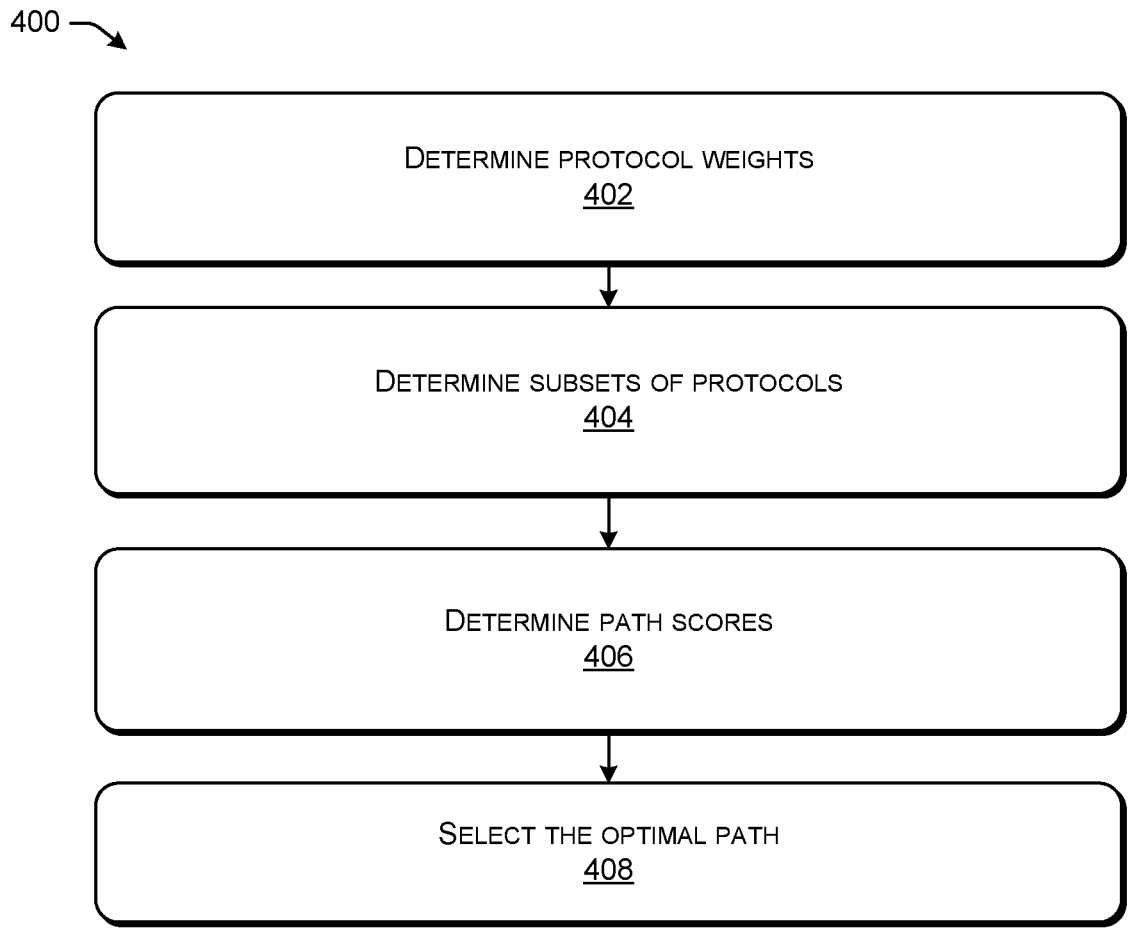
FIG. 4 is a flowchart diagram of an example process for selecting an optimal path based on paths recommended by a set of routing protocols.

FIG. 4 is a flowchart diagram of an example process 400 for selecting an optimal path based on paths recommended by a set of routing protocols. At operation 402, the process 400 includes determining a weight for each of the routing protocols. In some cases, the weight of a routing protocol is determined based on the reliability and/or security of the security metric data collected by the routing protocol. For example, a routing protocol that collects attestation indicators may have a higher weight relative to a routing protocol that does not collect attestation indicators. As another example, a routing protocol that uses BFD to monitor the network may have a higher weight relative to a routing protocol that does not use BFD to monitor the network. As a further example, a routing protocol that uses BFD with authentication may have a higher weight relative to a routing protocol that uses BFD without authentication.

At operation 404, the process 400 includes determining, for each candidate path from a set of candidate paths, a subset of the routing protocols that recommend the candidate path. In some cases, a candidate path is recommended by a routing protocol based on the routing protocol cost measure associated with the candidate path in relation to the routing protocol and the security cost measure associated with the candidate path in relation to the routing protocol. For example, in some cases, after computing a routing protocol cost measure and a security cost measure associated with a routing protocol in relation to a candidate path, the system determines a collapsed cost measure based on (e.g., by summing, by determining a weighted sum of, and/or the like) the routing protocol cost measure and the security cost measure, and then selects the candidate path having the lowest collapsed cost measure as the path recommended by the routing protocol. In some cases, after computing a routing protocol cost measure and a security cost measure associated with a routing protocol in relation to a candidate path, the system: (i) selects a subset of candidate paths that include each path whose security cost measure falls below a threshold, and (ii) selects the path in the subset that has the lowest routing protocol cost measure as the path recommended by the routing protocol. In some cases, a candidate path may be recommended by zero or more routing protocols, such that a candidate path may not be recommended by any routing protocols while another candidate path may be recommended by more than one routing protocol.

At operation 406, the process 400 includes determining, for each candidate path, a path score. The path score associated with the candidate path may represent a measure of reliability of all routing protocols that recommend the candidate path. In some cases, the system may determine a path score for each candidate path based on (e.g., by combining) the weights of all of the routing protocols that recommended the candidate path.

At operation 408, the process 400 includes determining the optimal path based on the determined path scores. In some cases, the system may determine the candidate path having the highest path score as the recommended path for transmitting data to a destination node associated with the set of candidate paths. For example, if two candidate paths exist between a source node and a destination node including a path P1 that is recommended by a first protocol having a weight W1 and a third protocol having a second weight W2 and a second path P2 that is recommended by a second protocol having a weight W3, then the system may select P1 as the recommended path if W1+W2>W3.

Figure 5:
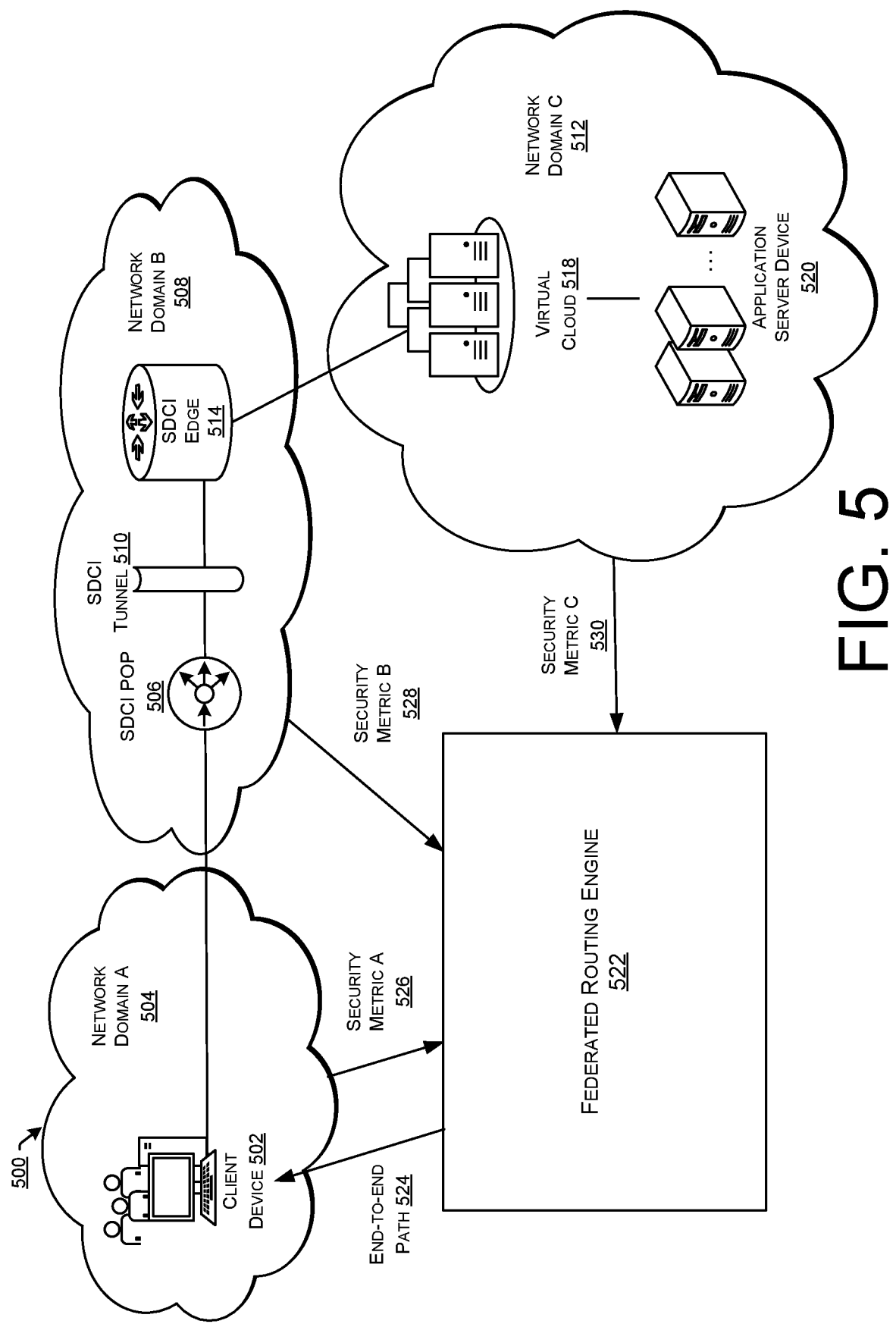
FIG. 5 depicts a multi-domain network environment.

FIG. 5 depicts a multi-domain network environment 500. As depicted in FIG. 5, the multi-domain network environment 500 includes a network domain A 504, a network domain B 508, and a network domain C 512. The network domain A 504 includes a client device 502. The network domain B 508 includes a software-defined cloud interconnect tunnel (SDCI) point of presence (POP) 506, an SDCI tunnel 510, and an SDCI edge router 514. The network domain C 512 includes a virtual cloud 518 and an application server device 520. The network domain A 504 may be a local and/or an enterprise domain, the network domain B 508 may be an SDCI domain, and the network domain C 512 may be a cloud environment domain. In some cases, traffic flows from the client device 502 to the SDCI POP 506, then through the SDCI tunnel 510, the SDCI edge router 514, the virtual cloud 518, and finally reaches the application server device 520. This path enables communication and access to resources and services hosted within the network.

The client device 502 may be an endpoint device, such as a computer or a smartphone, that initiates communication within the multi-domain network environment 500. The client device 502 can be implemented as a physical device or a virtual machine. The client device 502 may generate traffic and transmit the generated traffic across the network to access services or resources in other domains.

The SDCI POP 506 may operate as a gateway or access point for the SDCI tunnel 510 connections. The SDCI POP 506 may serve as an entry point for traffic entering or leaving an SDCI. The SDCI POP 506 can be implemented as a system with the necessary infrastructure to handle the SDCI tunnels.

The SDCI tunnel 510 may provide a secure and encrypted connection between the network domains. The SDCI tunnel 510 may facilitate the transfer of traffic between different network domains, allowing for secure communication over potentially untrusted networks. The SDCI tunnel can be implemented using various tunneling protocols, such as Internet Protocol Security (IPsec) or Multi-protocol label switching (MPLS), to establish a secure connection between the SDCI edge router 514 and the network domain A 504.

The SDCI edge router 514 may be configured to perform operations for receiving and forwarding traffic between the SDCI tunnel 510 and the network domain A 504. The SDCI edge router 514 may operate as a boundary device between the SDCI network and the network domain A 504, performing routing and forwarding functions. The SDCI edge router 514 can be implemented as a dedicated physical router or as a virtual router running on a server.

The virtual cloud 518 may operate as a virtualized infrastructure within network domain C 512. The virtual cloud 518 may provide a scalable and flexible environment for hosting various applications and services. The virtual cloud 518 can be implemented using virtualization technologies, such as hypervisors or containers, to create and manage virtual machines or virtualized network functions.

The application server device 520 may be a network device that hosts and provides specific services or applications. The application server device 520 may reside within the virtual cloud 518 in network domain C 512 and receives traffic from the SDCI edge router 514. The application server device 520 can be implemented as a physical server or a virtual machine running specialized software or services to fulfill specific application requirements.

As further depicted in FIG. 5, the multi-domain network environment 500 also includes a federated routing engine 522 that may be configured to perform operations for receiving security metric data from various network domains and utilizing this data to evaluate paths and make path recommendations. The federated routing engine 522 may operate as a central entity for path determination and optimization across the network domains.

In some cases, the federated routing engine 522 receives distinct security metrics from different network domains. For example, as depicted in FIG. 5, the federated routing engine 522 receives security metric A 526 from network domain A 504, security metric B 528 from network domain B 508, and security metric C 530 from network domain C 512. These security metrics may capture information related to the security, reliability, or other relevant factors of the respective network domains. Each domain may provide specific security metric data based on its characteristics and requirements.

A security metric may include a set of features that relate to the security of at least one node within a network domain. These features may provide valuable insights into various aspects of security within the network domain. Examples of security features include: (i) an encryption indicator describing whether at least one network node encrypts data transmitted on a first network domain link in the first path; (ii) an attestation indicator describing whether an attestation token provided by at least one network domain node is verified; (iii) a secureness metric associated with at least one network domain node and/or at least one network domain link (e.g., as computed based on data obtained using an NTA operation); (iv) a reliability metric associated with at least one network domain path (e.g., as determined based on data obtained using an OAM protocol); and (v) a measure of denial service attacks received by at least one network domain node.

The federated routing engine 522 may collect and combine these received security metrics to create a comprehensive view of the network's security landscape. By considering these security metrics, the federated routing engine may assess the trustworthiness, performance, and other relevant aspects of the available paths. This evaluation allows the federated routing engine to make informed decisions when recommending end-to-end paths for the client device 502.

Additionally, the federated routing engine 522 may transmit the recommended end-to-end paths 524 back to the client device 502. These recommended paths may represent the most suitable routes based on the evaluation of the security metrics and other relevant factors. The federated routing engine 522 may perform path computation based on data received from the entire network environment, taking into account the security metric data from multiple domains to ensure optimal path selection.

In some cases, the implementation of the federated routing engine 522 involves deploying a centralized routing entity capable of receiving and processing security metric data from various network domains. In some cases, the implementation of the federated routing engine 522 requires establishing communication channels with the network domains to gather the security metric information. The routing engine can then apply algorithms and policies to evaluate the collected data and generate recommended end-to-end paths for the client device. By leveraging the federated routing engine 522 and the security metric data received from different network domains, the multi-domain network environment 500 can benefit from a holistic and intelligent approach to path evaluation and recommendation. This facilitates efficient and secure communication throughout the network, ensuring that the traffic from client device 502 is directed along optimal paths that meet the security requirements and performance expectations of the entire multi-domain network environment 500.

Figure 6:
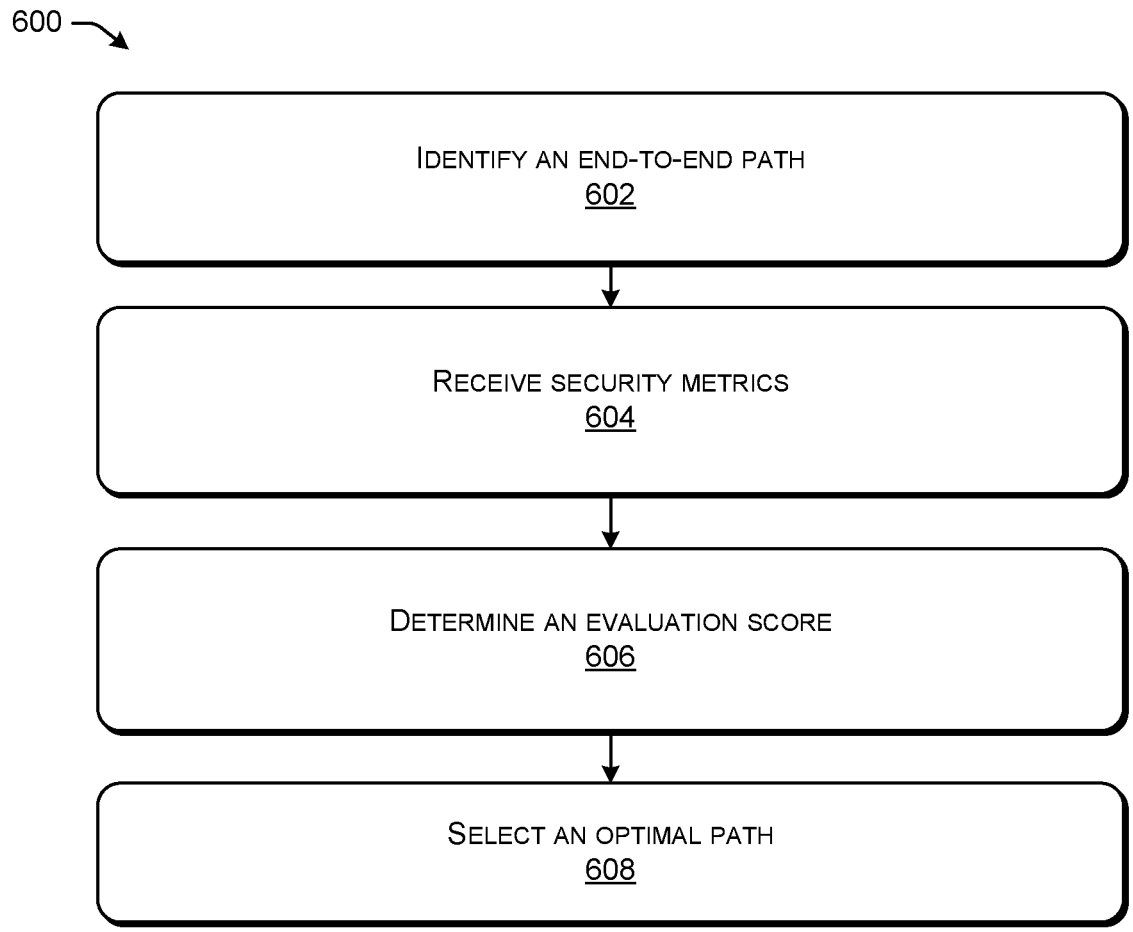
FIG. 6 is a flowchart diagram of an example process for determining an end-to-end path in a multi-domain network environment.

FIG. 6 is a flowchart diagram of an example process 600 for determining an end-to-end path in a multi-domain network environment. As depicted in FIG. 6, at operation 602, process 600 includes identifying a cross-domain path. A cross-domain path may be a path that includes network links and/or network domains across two or more network domain. A network domain may describe a network segment that is configured to provide a respective security metric to a federated routing engine that may be different from security metrics provided by other network components. In some cases, a network domain refers to a logical or physical grouping of network devices, resources, and services that are administratively controlled and managed by a single entity or organization. In some cases, a network domain represents a distinct portion of a larger computer network, typically organized based on administrative boundaries, geographical locations, security requirements, or functional purposes. In some cases, in a network domain, the organization or entity has authority over the configuration, management, and security of the network infrastructure and resources within that specific domain.

At operation 604, process 600 includes receiving, from each network domain, a respective security metric. A security metric received from a network domain may include a set of features that relate to the security of at least one node within the corresponding network domain. These features may provide valuable insights into various aspects of security within the network domain. Examples of security features include: (i) an encryption indicator describing whether at least one network node encrypts data transmitted on a first network domain link in the first path; (ii) an attestation indicator describing whether an attestation token provided by at least one network domain node is verified; (iii) a secureness metric associated with at least one network domain node and/or at least one network domain link (e.g., as computed based on data obtained using an NTA operation); (iv) a reliability metric associated with at least one network domain path (e.g., as determined based on data obtained using an OAM protocol); and (v) a measure of denial service attacks received by at least one network domain node.

At operation 606, process 600 includes determining an evaluation score for the end-to-end path. In some cases, the evaluation score represents a measure of security of the end-to-end path. In some cases, to determine the evaluation score for an end-to-end path, a federated routing engine determines a domain score for each network domain that is associated with the end-to-end path. A domain score may represent an expected level of security achieved within a network domain, for example as determined based on the security metrics provided by the network domain. The federated routing engine may use various factors when calculating the domain scores, including the security metrics, access controls, authentication mechanisms, encryption protocols, and other relevant security measures implemented within each domain.

To determine the evaluation score for the end-to-end path, the federated routing engine may combine the domain scores associated with each network domain traversed along the path. This aggregation allows for a comprehensive assessment of the overall security level of the end-to-end path. The evaluation score provides a quantifiable measure of the path's security, aiding in the decision-making process for selecting the most secure route.

At operation 608, the process 600 includes determining the optimal end-to-end path based on the determined evaluation score. In some cases, the federated routing engine selects an end-to-end path having the highest evaluation score as the optimal end-to-end evaluation score. In some cases, by calculating the evaluation score based on the domain scores, the federated routing engine can prioritize paths with higher security levels, ensuring that sensitive data or critical communications follow the most secure path available. This scoring mechanism may enable mitigating security risks, enhancing network resilience, and aligning with security policies and requirements defined within the network environment.

Figure 7:
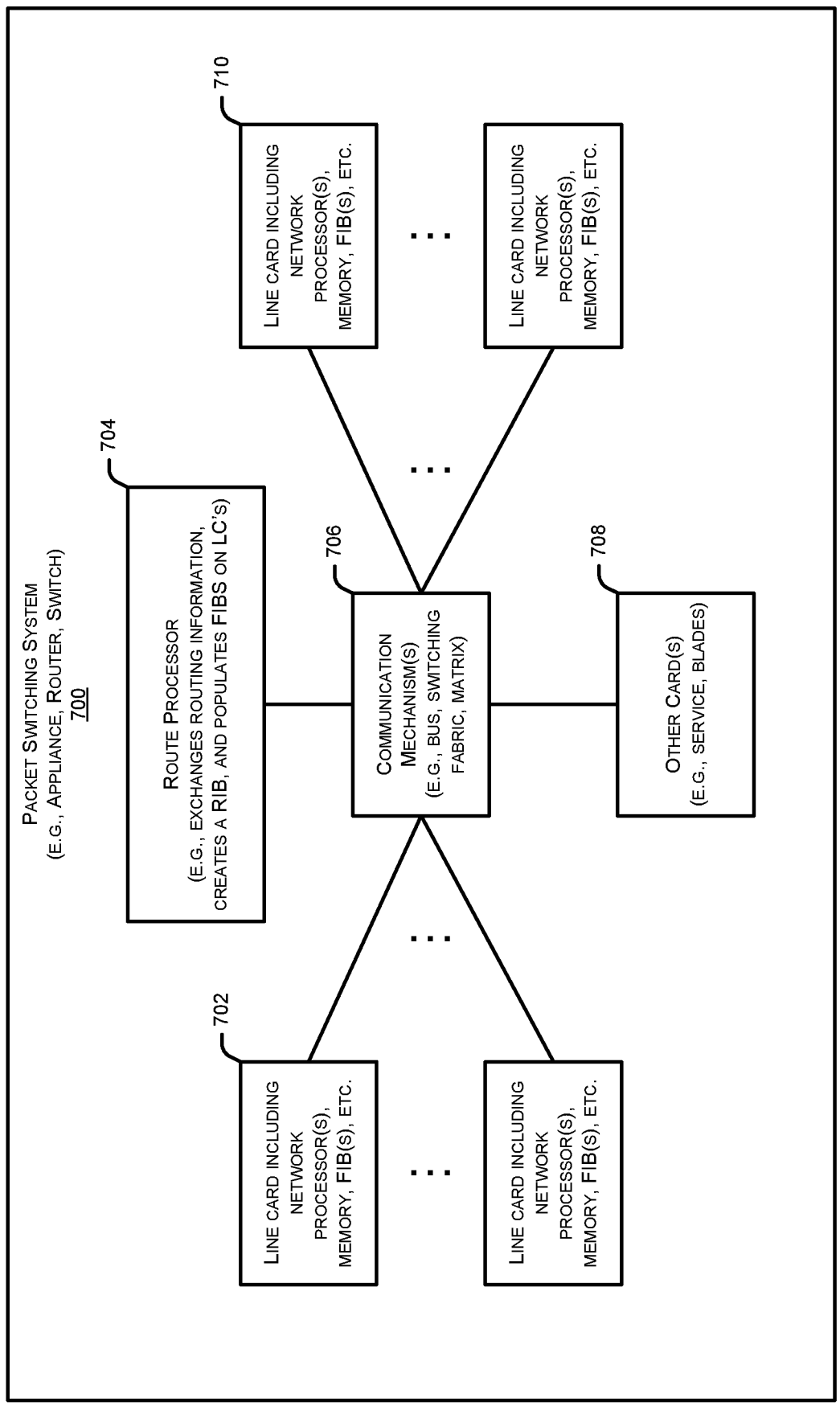
FIG. 7 illustrates a block diagram illustrating an example packet switching device (or system) that can be utilized to implement various aspects of the technologies disclosed herein.

FIG. 7 illustrates a block diagram illustrating an example packet switching device (or system) 700 that can be utilized to implement various aspects of the technologies disclosed herein. In some examples, packet switching device(s) 700 may be employed in various networks, such as an SDWAN. The packet switching device may, for example, be a branch router or an edge router.

In some examples, a packet switching device 700 may comprise multiple line card(s) 702, 710, each with one or more network interfaces for sending and receiving packets over communications links (e.g., possibly part of a link aggregation group). The packet switching device 700 may also have a control plane with one or more processing elements 706 for managing the control plane and/or control plane processing of packets associated with forwarding of packets in a network. The packet switching device 700 may also include other cards 708 (e.g., service cards, blades) which include processing elements that are used to process (e.g., forward/send, drop, manipulate, change, modify, receive, create, duplicate, apply a service) packets associated with forwarding of packets in a network. The packet switching device 700 may comprise hardware-based communication mechanism 706 (e.g., bus, switching fabric, and/or matrix, etc.) for allowing its different entities 702, 704, 708 and 710 to communicate. Line card(s) 702, 710 may typically perform the actions of being both an ingress and/or an egress line card 702, 710, in regard to multiple other particular packets and/or packet streams being received by, or sent from, packet switching device 700.

Figure 8:
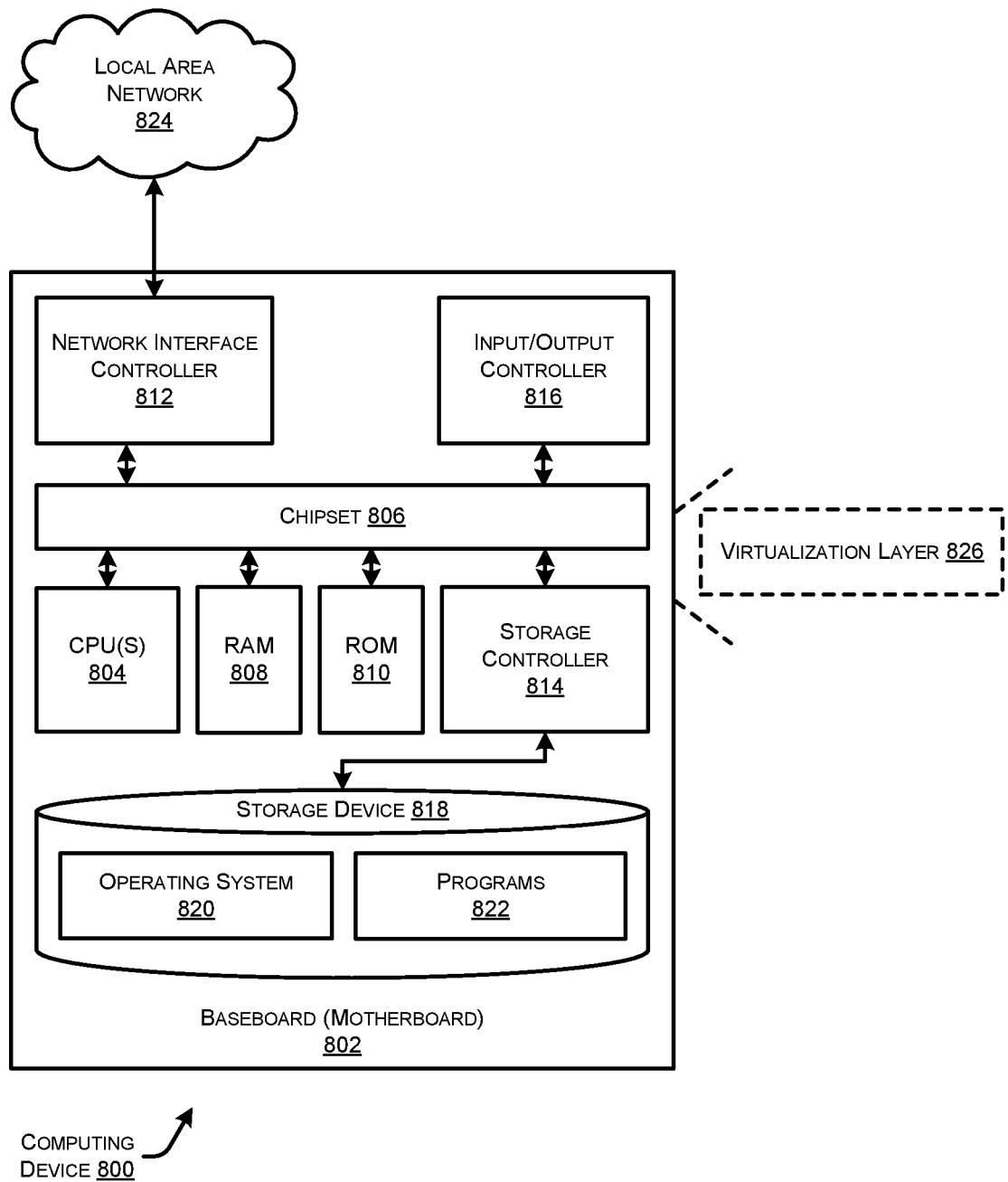
FIG. 8 shows an example computer architecture for a computing device (or network routing device) capable of executing program components for implementing the functionality described above.

FIG. 8 shows an example computer architecture for a computing device (or network routing device) 800 capable of executing program components for implementing the functionality described above. The computer architecture shown in FIG. 8 illustrates a conventional server computer, workstation, desktop computer, laptop, tablet, network appliance, e-reader, smartphone, or other computing device, and can be utilized to execute any of the software components presented herein.

The computing device 800 includes a baseboard 802, or "motherboard," which is a printed circuit board to which a multitude of components or devices can be connected by way of a system bus or other electrical communication paths. In one illustrative configuration, one or more central processing units ("CPUs") 804 operate in conjunction with a chipset 806. The CPUs 804 can be standard programmable processors that perform arithmetic and logical operations necessary for the operation of the computing device 800.

The CPUs 804 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 806 provides an interface between the CPUs 804 and the remainder of the components and devices on the baseboard 802. The chipset 806 can provide an interface to a RAM 808, used as the main memory in the computing device 800. The chipset 806 can further provide an interface to a computer-readable storage medium such as a read-only memory ("ROM") 810 or non-volatile RAM ("NVRAM") for storing basic routines that help to startup the computing device 800 and to transfer information between the various components and devices. The ROM 810 or NVRAM can also store other software components necessary for the operation of the computing device 800 in accordance with the configurations described herein.

The computing device 800 can operate in a networked environment using logical connections to remote computing devices and computer systems through a network, such as the network 824. The chipset 806 can include functionality for providing network connectivity through a NIC 812, such as a gigabit Ethernet adapter. The NIC 812 is capable of connecting the computing device 800 to other computing devices over the network 824. It should be appreciated that multiple NICs 812 can be present in the computing device 800, connecting the computer to other types of networks and remote computer systems.

The computing device 800 can be connected to a storage device 818 that provides non-volatile storage for the computing device 800. The storage device 818 can store an operating system 820, programs 822, and data, which have been described in greater detail herein. The storage device 818 can be connected to the computing device 800 through a storage controller 814 connected to the chipset 806. The storage device 818 can consist of one or more physical storage units. The storage controller 814 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computing device 800 can store data on the storage device 818 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 818 is characterized as primary or secondary storage, and the like.

For example, the computing device 800 can store information to the storage device 818 by issuing instructions through the storage controller 814 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computing device 800 can further read information from the storage device 818 by detecting the physical states or characteristics of one or more particular locations within the physical storage units.

In addition to the mass storage device 818 described above, the computing device 800 can have access to other computer-readable storage media to store and retrieve information, such as program modules, data structures, or other data. It should be appreciated by those skilled in the art that computer-readable storage media is any available media that provides for the non-transitory storage of data and that can be accessed by the computing device 800. In some examples, the operations performed by a network, and/or any components included therein (e.g., a router, such as an edge router), may be supported by one or more devices similar to computing device 800. Stated otherwise, some or all of the operations performed by the network, and or any components included therein, may be performed by one or more computing device 800 operating in a cloud-based arrangement.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage device 818 can store an operating system 820 utilized to control the operation of the computing device 800. According to one embodiment, the operating system comprises the LINUX operating system. According to another embodiment, the operating system comprises the WINDOWS® SERVER operating system from MICROSOFT Corporation of Redmond, Washington. According to further embodiments, the operating system can comprise the UNIX operating system or one of its variants. It should be appreciated that other operating systems can also be utilized. The storage device 818 can store other system or application programs and data utilized by the computing device 800.

In one embodiment, the storage device 818 or other computer-readable storage media is encoded with computer-executable instructions which, when loaded into the computing device 800, transform the computer from a general-purpose computing system into a special-purpose computer capable of implementing the embodiments described herein. These computer-executable instructions transform the computing device 800 by specifying how the CPUs 804 transition between states, as described above. According to one embodiment, the computing device 800 has access to computer-readable storage media storing computer-executable instructions which, when executed by the computing device 800, perform the various processes described above with regard to FIGS. 1-6. The computing device 800 can also include computer-readable storage media having instructions stored thereupon for performing any of the other computer-implemented operations described herein.

The computing device 800 can also include one or more input/output controllers 816 for receiving and processing input from a number of input devices, such as a keyboard, a mouse, a touchpad, a touch screen, an electronic stylus, or other type of input device. Similarly, an input/output controller 816 can provide output to a display, such as a computer monitor, a flat-panel display, a digital projector, a printer, or other type of output device. It will be appreciated that the computing device 800 might not include all of the components shown in FIG. 8, can include other components that are not explicitly shown in FIG. 8, or might utilize an architecture completely different than that shown in FIG. 8.

The computing device 800 may support a virtualization layer 826, such as one or more components associated with a computing resource network. The virtualization layer 826 may provide virtual machines or containers that abstract the underlying hardware resources and enable multiple operating systems or applications to run simultaneously on the same physical machine. The virtualization layer 826 may also include components for managing the virtualized resources, such as a hypervisor or virtual machine manager, and may provide network virtualization capabilities, such as virtual switches, routers, or firewalls. By enabling the sharing and efficient utilization of physical resources, virtualization can help reduce costs, simplify management, and increase flexibility in deploying and scaling computing workloads. The computing device 800 may also support other software layers, such as middleware, application frameworks, or databases, that provide additional abstraction and services to application developers and users. In some cases, the computing device 800 may provide a flexible and scalable platform for hosting diverse workloads and applications, from simple web services to complex data analytics and machine learning tasks.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A computer-implemented method comprising:
receiving, using a first routing protocol, a first security metric associated with a first path to a destination node, wherein the first security metric is associated with a first weight;
determining, using a first path computation operation associated with the first routing protocol, a first routing protocol cost measure associated with the first path;
determining, based on the first security metric, a first security cost measure associated with the first path;
determining, based on the first routing protocol cost measure and the first security cost measure, that the first path is recommended by the first routing protocol for data transmission to the destination node;
receiving, using a second routing protocol, a second security metric associated with a second path to the destination node, wherein the second security metric is associated with a second weight;
determining, using a second path computation operation associated with the second routing protocol, a second routing protocol cost measure associated with the second path;
determining, based on the second security metric, a second security cost measure associated with the second path;
determining, based on the second routing protocol cost measure and the second security cost measure, that the second path is recommended by the second routing protocol for data transmission to the destination node; and
based at least in part on determining that the first path and the second path are distinct, determining a selected path to the destination node based at least in part on the first weight and the second weight.

2. The computer-implemented method of claim 1, wherein the first security metric is determined based on at least one of:
- a first indicator of whether a first node associated with the first path encrypts data transmitted on a first link in the first path;
- a second indicator of whether an attestation token provided to the first node is verified;
- a secureness metric associated with the first path as computed by a network traffic analysis (NTA) operation; or
- a reliability metric as determined based on first data collected using an operations, administration and maintenance (OAM) protocol.

3. The computer-implemented method of claim 1, wherein the first routing protocol is an Open Shortest Path First (OSPF) routing protocol and the second routing protocol is an Enhanced Interior Gateway Routing protocol (EIGRP) routing protocol.

4. The computer-implemented method of claim 1, wherein the first security metric is distributed to a first node by a neighbor node and using a link state data distribution operation associated with the first routing protocol.

5. The computer-implemented method of claim 1, wherein determining the selected path comprises:
- determining, based at least in part on the first weight, a first routing protocol score associated with the first routing protocol;
- determining, based at least in part on the second weight, a second routing protocol score associated with the second routing protocol;
- determining, based at least in part on the first routing protocol score and a third routing protocol score associated with a third routing protocol that recommends the first path for data transmission to the destination node, a first path score for the first path;
- determining, based at least in part on the second routing protocol score, a second path score for the second path; and
- determining the selected path based at least in part on the first path score and the second path score.

6. The computer-implemented method of claim 5, wherein determining the first routing protocol score comprises:
- receiving, using the first routing protocol, a third security metric associated with the first path, wherein the third security metric is associated with a third weight; and
- determining the first routing protocol score based on the first weight and the third weight.

7. The computer-implemented method of claim 5, wherein determining the selected path comprises:
- based at least in part on determining that the first routing protocol score exceeds the second routing protocol score, determining that the first path has priority over the second path; and
- determining the selected path as a highest-priority path among paths recommended by a plurality of routing protocols, wherein the plurality of routing protocols comprise the first routing protocol, the second routing protocol, and the third routing protocol.

8. The computer-implemented method of claim 1, wherein determining that the first path is recommended by the first routing protocol comprises:
- combining first routing protocol cost measure and the first security cost measure to determine a first collapsed cost measure; and
- determining that the first collapsed cost measure is a highest collapsed cost measure among collapsed cost measures associated with a plurality of available paths to the destination node.

9. The computer-implemented method of claim 1, wherein determining that the first path is recommended by the first routing protocol comprises:
- based on determining that the first security cost measure falls below a threshold, determining that the first path is among a first subset of a plurality of available paths; and
- determining that the first routing protocol cost measure is a lowest routing protocol cost measure among routing protocol cost measures associated with the first subset.

10. The computer-implemented method of claim 1, wherein:
- at least one of the first path or the second path includes network links in a plurality of network domains; and
- the computer-implemented method is performed by a computing entity that receives network monitoring data from the plurality of network domains.

11. A computer-implemented method comprising:
- receiving a request for evaluating a first path from a source node to a destination node;
- determining that the first path comprises a first link in a first network domain and a second link in a second network domain, wherein the first network domain is associated with a first security data schema and the second network domain is associated with a second security data schema;
- receiving a first security metric associated with the first network domain from a first monitoring system associated with the first network domain, wherein the first security metric corresponds to the first security data schema;
- receiving a second security metric associated with the second network domain from a second monitoring system associated with the second network domain, wherein the second security metric corresponds to the second security data schema;
- determining an evaluation score for the first path based at least in part on the first security metric and the second security metric; and
- selecting a recommended path for data transmission from the source node to the destination node based at least in part on the evaluation score.

12. The computer-implemented method of claim 11, wherein the first network domain is determined based on at least one of:
- a first connection between the source node and a first software-defined cloud interconnect point of presence;
- a second connection between the first software-defined cloud interconnect point of presence and a first software-defined cloud interconnect tunnel;
- a third connection between the first software-defined cloud interconnect tunnel and a first software-defined cloud interconnect edge router;
- a fourth connection between the first software-defined cloud interconnect edge router and a first virtual private cloud; or
- a fifth connection between the first virtual private cloud and a first application server.

13. The computer-implemented method of claim 11, wherein the first security metric is determined based on at least one of:
- a first indicator of whether a first node associated with the first link encrypts data prior to transmission on the first link;
- a second indicator of whether an attestation token provided to the first node is verified;
- a secureness metric associated with the first network domain as computed by a network traffic analysis (NTA) operation;
- a reliability metric associated with the first network domain as determined based on first data collected using an operations, administration and maintenance (OAM) protocol; or
- a measure of denial service attacks received by the first node.

14. The computer-implemented method of claim 11, wherein determining the evaluation score comprises:
- determining a first domain score associated with the first network domain based at least in part on the first security metric;
- determining a second domain score associated with the second network domain based at least in part on the second security metric; and
- determining the evaluation score based on the first domain score and the second domain score.

15. The computer-implemented method of claim 11, wherein the first network domain is an enterprise network domain, the second network domain is a software-defined cloud interconnect network domain, a the third network is a cloud environment domain.

16. A system comprising:
- one or more processors; and
- one or more computer-readable media storing computer-executable instructions that, when executed by the one or more processors, cause the one or more processors to perform operations comprising:
  - receiving, using a first routing protocol, a first security metric associated with a first path to a destination node, wherein the first security metric is associated with a first weight;
  - determining, using a first path computation operation associated with the first routing protocol, a first routing protocol cost measure associated with the first path;
  - determining, based on the first security metric, a first security cost measure associated with the first path;
  - determining, based on the first routing protocol cost measure and the first security cost measure, that the first path is recommended by the first routing protocol for data transmission to the destination node;
  - receiving, using a second routing protocol, a second security metric associated with a second path to the destination node, wherein the second security metric is associated with a second weight;
  - determining, using a second path computation operation associated with the second routing protocol, a second routing protocol cost measure associated with the second path;
  - determining, based on the second security metric, a second security cost measure associated with the second path;
  - determining, based on the second routing protocol cost measure and the second security cost measure, that the second path is recommended by the second routing protocol for data transmission to the destination node; and
  - based at least in part on determining that the first path and the second path are distinct, determining a selected path to the destination node based at least in part on the first weight and the second weight.

17. The system of claim 16, wherein the first security metric is determined based on at least one of:
- a first indicator of whether a first node associated with the first path encrypts data transmitted on a first link in the first path;
- a second indicator of whether an attestation token provided to the first node is verified;
- a secureness metric associated with the first path as computed by a network traffic analysis (NTA) operation; or
- a reliability metric as determined based on first data collected using an operations, administration and maintenance (OAM) protocol.

18. The system of claim 16, wherein the first routing protocol is an Open Shortest Path First (OSPF) routing protocol and the second routing protocol is an Enhanced Interior Gateway Routing protocol (EIGRP) routing protocol.

19. The system of claim 16, wherein the first security metric is distributed to a first node by a neighbor node and using a link state data distribution operation associated with the first routing protocol.

20. The system of claim 16, wherein determining the selected path comprises:
- determining, based at least in part on the first weight, a first routing protocol score associated with the first routing protocol;
- determining, based at least in part on the second weight, a second routing protocol score associated with the second routing protocol;
- determining, based at least in part on the first routing protocol score and a third routing protocol score associated with a third routing protocol that recommends the first path for data transmission to the destination node, a first path score for the first path;
- determining, based at least in part on the second routing protocol score, a second path score for the second path; and
- determining the selected path based at least in part on the first path score and the second path score.

* * * * *